Sept. 9, 1969  YASUHIKO MATUNAGA  3,465,723
AUTOMATICALLY OPERATING LAYING NEST BOX FOR POULTRY
Filed Sept. 11, 1967  2 Sheets-Sheet 1

INVENTOR.
Yasuhiko Matunaga
BY
Attorneys

United States Patent Office 3,465,723
Patented Sept. 9, 1969

3,465,723
AUTOMATICALLY OPERATING LAYING NEST BOX FOR POULTRY
Yasuhiko Matunaga, 950 Maejima, Shizuoka-ken, Fujieda-shi, Japan
Filed Sept. 11, 1967, Ser. No. 666,868
Claims priority, application Japan, Sept. 21, 1966, 41/62,523
Int. Cl. A01k *31/16*
U.S. Cl. 119—48      3 Claims

ABSTRACT OF THE DISCLOSURE

A laying nest box for hens is provided with a tiltable floor plate which is tilted level by the weight of a hen laying an egg and tilts forward into an unloaded position to cause the egg to roll forward toward a collecting tray. The floor plate is linked to a gate permitting only one hen to occupy the box at one time and functioning additionally to brake and temporarily hold the egg as well as to release the egg during the succeeding cycle of operation, permitting it to roll further into the collecting tray.

---

This invention relates generally to equipment for poultry husbandry and more particularly to a new egg-laying nest box device for poultry into which only one hen can enter at one time to lay an egg, which is then collected in a safe manner without damage or soiling.

Almost all laying nest boxes known heretofore for poultry are not provided with restricting doors or gates at their entrances. Consequently, two or more hens often enter a single nest box to cause crowding, which gives rise to much soiling and breakage of eggs, and in some cases the death of hens by suffocation or excessive pressure, as well as ailments, and harmful habits or behaviours in the hens such as the habit of eating eggs and pecking the posteriors of other hens. As a result, substantial labor and expenditure have been necessary for poultry husbandry and egg collection.

It is an object of the present invention to provide an automatically operating laying nest box device for poultry in which the above described difficulties are eliminated.

More specifically, an object of the invention is to provide an automatically operating laying nest box device into which only one hen is permitted to enter at one time to lay an egg, and in which each egg upon being laid is protectively collected and held in a sanitary manner until it is gathered and transported away.

Another object of the invention is to provide a nest box device of the above stated character which is automatically operated in a mechanical manner merely by the application and removal of the weight of a hen entering and leaving the interior of the nest box, no other motive power means being necessary.

A further object of the invention is to provide a nest box device of the above stated character which has simple construction and operation affording durability, freedom from malfunctioning, reliability of operation, and facility in fabrication and maintenance.

According to the present invention, briefly summarised, there is provided an automatically operating laying nest box device for poultry characterised by the combination of a box structure having a front opening, a laying floor plate pivoted within the box structure to tilt and assume, in unloaded state, a first position with a forward and downward slope and, under the weight of a hen, a substantially horizontal second position. A gate is operated by movement of the floor plate transmitted through a mechanism to close and open at least a part of the front opening in accordance with the first and second positions, respectively, of the floor plate. A portion of the gate, when in the opened state, serves to brake and temporarily hold a laid egg which has rolled down the slope of the floor plate when it is in the first position and release the egg with the succeeding closing movement of the gate. An egg collecting device is provided for collecting the egg thus released, and a guide platform device for guiding a hen onto and off the floor plate is also provided.

The nature, details, and utility of the invention will be more clearly apparent from the following detailed description with respect to a preferred embodiment of the invention when read in conjunction with the accompanying drawings, in which like parts are designated by like reference numerals.

Figure 1:
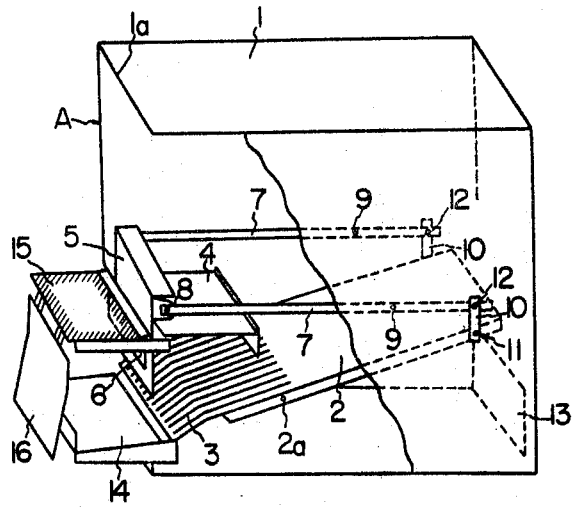
FIG. 1 is a perspective view, with parts cut away, showing an automatically operating poultry laying nest box according to the invention.
Figure 4:
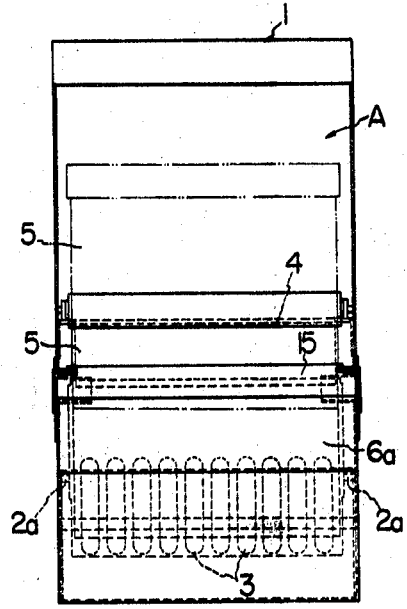
FIG. 4 is a front elevational view of the nest box.
Figure 2:
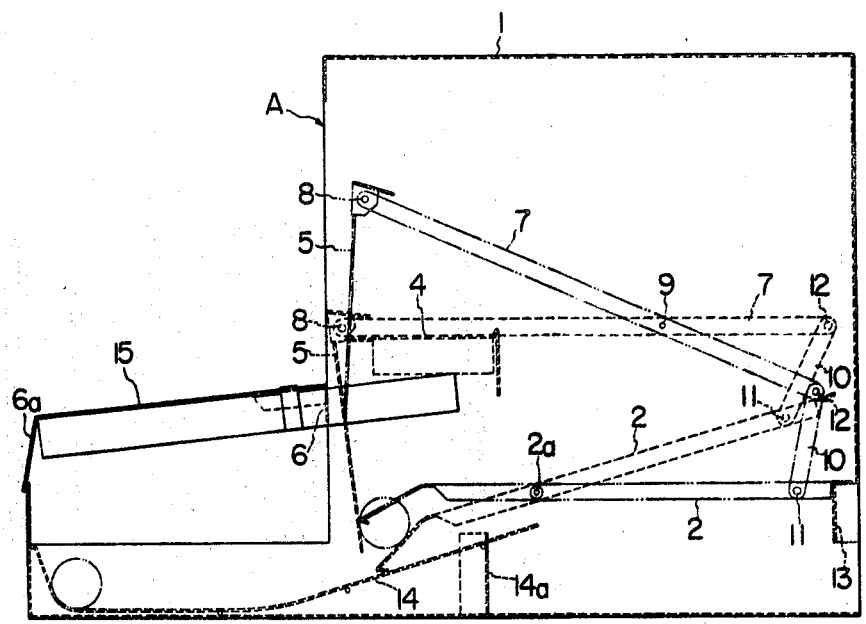
FIG. 2 is a side elevational view of the nest box shown in FIG. 1.
Figure 3:
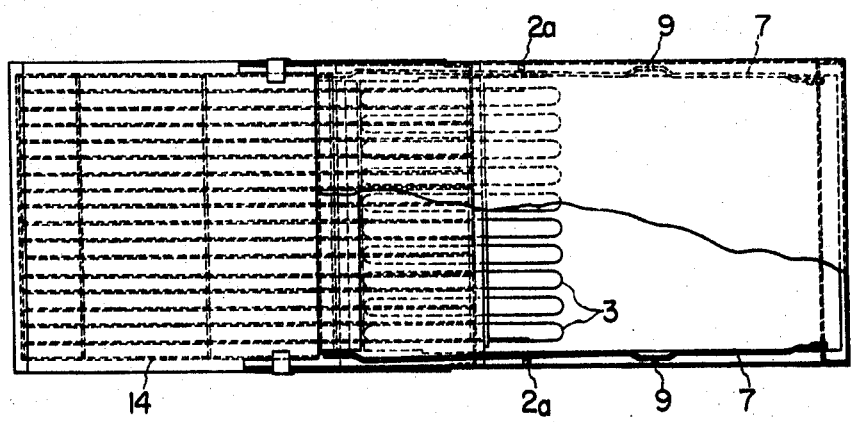
FIG. 3 is a plan view, with a part cut away, of the nest box.

Throughout this disclosure, directional terms such as "front," "rear," and "lateral sides," are used to indicate horizontal directions relative the sides of the nest box structure, the "front" and "rear" sides being the left-hand and right-hand sides, respectively, as viewed in FIG. 2, and the "lateral sides" being the left and right sides as viewed in FIG. 4.

Referring to the drawings, the example nest box shown therein has a principal box structure 1 provided with a front opening A in its front wall. In the interior of the box structure 1, and in a position raised above its bottom, there is provided a laying floor plate 2 which is pivotally supported at its lateral sides by pivots 2a on the lateral side walls of the box structure 1, and which is thereby tiltable about a horizontal axis passing through the pivots 2a at a position intermediate between the front and rear ends of the plate 2. The laying floor plate 2 has a front end which is slightly bent downward to form an inclined part sloping downward toward the front. The front half of the floor plate 2 including the inclined part is provided with several cut out slots 3 in parallel arrangement relative to each other and to the lateral side edges of the floor plate 2.

A horizontal middle platform 4 having a downwardly projecting transverse flange is fixed at its lateral sides to the lateral side walls of the box structure 1 at a height which is approximately midway between the upper and lower edges of the front opening A, the front edge of the platform 4 being slightly to the rear of the front opening A. A vertically moving door 5 with padded surfaces is provided to undergo vertical movement with respect to the front edge of the middle platform 4 and is guided by a guide plate 6 extending transversely across the opening A and fixed at its lateral ends to the lateral side walls of the box structure 1.

The vertically moving gate 5 at its upper corners is pivotally supported by and connected by pins 8 to the front ends of a pair of levers 7 pivotally supported at points 9 intermediate between their ends by the lateral side walls of the box structure 1. The rear ends of the levers 7 are linked by respective links 10 to the lateral sides of the rear end of the laying floor plate 2, each link 10 being pin jointed at its ends to the rear ends of the respective lever 7 and the laying floor 2 by pins 12 and 11, respectively. A stop plate 13 is fixed to the rear wall of the box structure 1 to prevent the rear end of the laying floor plate 2 from descending beyond a specific position, which corresponds, in the example shown, to that at which the floor plate 2 is substantially horizontal.

At the front bottom part of the box structure 1, there is provided an egg collecting tray 14 resting at its front part on a forward extension of the bottom of the box structure 1 and removably engaged at its upwardly sloping rear end with a support member 14a, which rear end extends upward and rearward into the box structure 1 below the front end part of the laying floor plate 2. Above the forward extension of the bottom of the box structure 1, there is provided an outer platform 15 with a downwardly bent rear flange constituting the aforementioned guide plate 6 for the vertically moving gate 5 and with a downwardly bent front cover plate 6a.

The laying nest box of the above described essential organization according to the invention operates in the following manner.

In the normal state of the nest box, that is, when it is unoccupied, the laying floor plate 2 is tilted in a forwardly sloping position as indicated by dotted line in FIG. 2, and the gate 5 is in its lowermost position.

In using the nest box, a hen enters the box by walking across the outer platform 15, through the front opening A, across the middle platform 4, and then onto the laying floor plate 2, whereupon the floor plate 2 is caused by the weight of the hen to rotate in the clockwise direction as viewed in FIG. 2 to assume its horizontal position as determined by the stop plate 13. At the same time, this movement of the floor plate 2 is transmitted through the links 10 and levers 7 to raise the gate 5 to a partly closed position at which a gap is formed between the upper edge of the gate 5 and the ceiling of the box structure 1, which gap is maintained at a size just sufficient for a hen to thrust its head out of the box structure 1. Thus, while the weight of the hen is being applied to the floor plate 2, another hen cannot enter the nest box.

After the hen has laid an egg, it attempts to leave the nest box, thrusting its head out through the above mentioned gap. As a natural result, the hen steps onto the middle platform 4, thereby shifting its weight off the laying floor plate 2, which thereupon reassumes its normal tilted position with forwardly descending slope. This movement of the floor plate 2 is transmitted through links 10 and levers 7 to lower the door 5 to its lowermost position, thereby permitting the hen to walk out of the nest box. At the same time, the slope of the floor plate 2 causes the laid egg to roll forward utnil it is braked and stopped by the padded lower part of the gate 5 and is thereby temporarily held.

When the above described cycle of operation is repeated, the temporarily held egg is released by the upward movement of the gate 5 and rolls into and is collected by the aforedescribed egg collecting tray 14. Accordingly, it is possible to secure safely an undamaged egg at each instance of egg laying, and, moreover, there is no possibility of adverse results as death by suffocation or pressure and illness of hens and development of undesirable habits.

In order to indicate the utility of the present invention, the following example of actual practice is set forth. Laying nest boxes according to the invention were used with a single collection of eggs by an operator per day, whereupon the following results were obtained.

(1) The egg damage rate was 0.5 percent.

(2) The cost necessary for washing soiled eggs was zero, and there were no instances of illness or undesirable habits of the hens attributable to the egg laying.

(3) The amount of labor for egg collection was from ½ to ⅓ that ordinarily necessary heretofore.

What I claim is:

1. An automatically operating laying nest box device for poultry comprising: a box structure having a front opening; a laying floor plate disposed within the box structure and tiltably pivoted to be in a first position having a forwardly descending slope in unloaded state and to pivot under the weight of a hen to a substantially horizontal second position; a movement transmitting mechanism; a gate connected to and operated through said mechanism by movement of the floor plate to open and close at least a part of said front opening in accordance with said first and second positions respectively, a portion of said gate when open serving to brake and temporarily hold a laid egg which has rolled down the slope of the floor plate when in said first position, and release the egg during the succeeding closing movement of the gate; egg collecting means for collecting the egg thus released; and guide platform means for guiding a hen onto and off the floor plate.

2. An automatically operating laying nest box device for poultry comprising:
a box structure having a front opening;
a laying floor plate having an inclined and a substantially horizontal position and being pivotally supported in the lower part of the box structure juxtaposed the front end on lateral side walls of the box structure, the front end portion of said floor plate having a bend with a slight forwardly descending slope and several cutout slots in parallel arrangement in front and rear alignment;
a horizontal middle platform fixed to the box structure in a position above the front end portion of the floor plate;
a vertically moving gate connected to said platform, vertically movable past the front edge of the middle platform, and defining a means for blocking the front end of said floor plate to prohibit the passage of an egg when said floor plate is in said inclined position and releasing the egg when the floor plate is in its horizontal position, said connection including;
a mechanism for coupling the floor plate to the gate comprising levers which are pin connected at their front ends to the upper corners of the gate, pivotally supported on the lateral side walls and links which are pin connected respectively to the rear ends of the levers and rear end parts of the floor plate, a stop plate being provided below the rear end of the floor plate to restrict its downward movement;
an outer platform provided in front of the gate and having a downwardly bent flange at its rear part constituting a guide plate for the gate and a downwardly bent flange at its front part constituting a cover plate; and
an egg collecting tray disposed below the outer platform on the bottom of the box structure and removably engaged at its rear end with a support member below said front end portion of the floor plate.

3. An automatically operating laying nest box device as claimed in claim 1 wherein said portion of the gate which brakes and temporarily holds the laid egg is padded to prevent breakage.

References Cited

UNITED STATES PATENTS

| | | | |
|---|---|---|---|
| 2,108,287 | 2/1938 | Kellum | 119—48 X |
| 2,279,147 | 4/1942 | Stimson | 119—48 |
| 2,584,054 | 1/1952 | Shaffer | 119—48 |
| 2,692,578 | 10/1954 | Manning | 119—48 |
| 2,737,926 | 3/1956 | Maness | 119—48 X |
| 2,764,128 | 9/1956 | Howley et al. | 119—48 X |
| 2,765,772 | 10/1956 | Inman | 119—48 |
| 2,975,759 | 3/1961 | Stromblad | 119—48 X |

ALDRICH F. MEDBERY, Primary Examiner

U.S. Cl. X.R.

119—50